July 4, 1950 H. C. FLINT 2,514,214
CUSHIONING STRUCTURE
Filed April 15, 1946
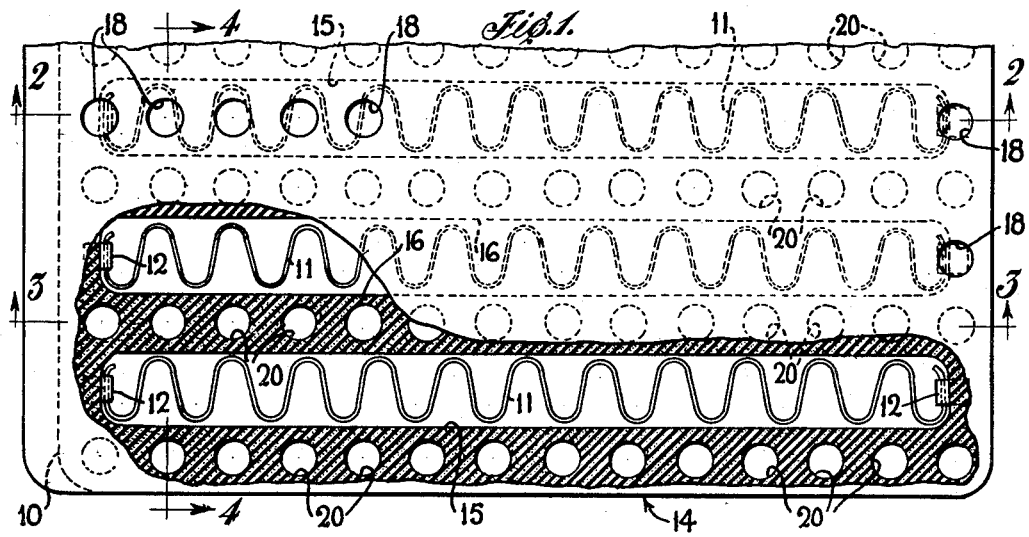
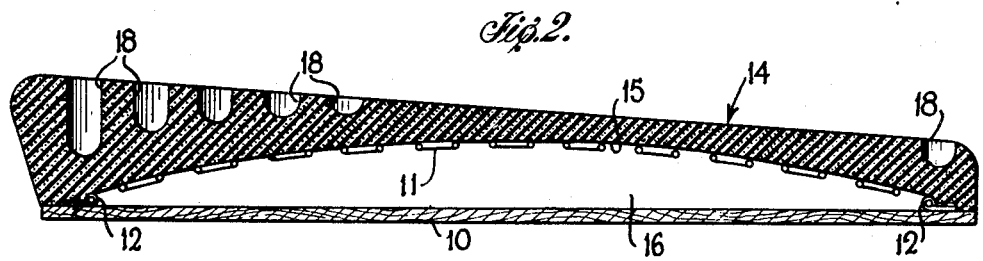
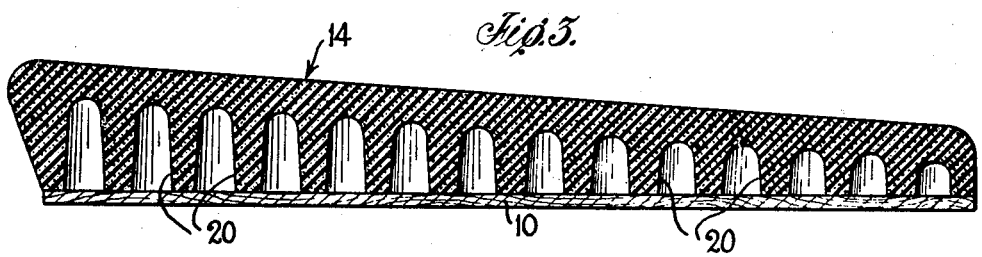
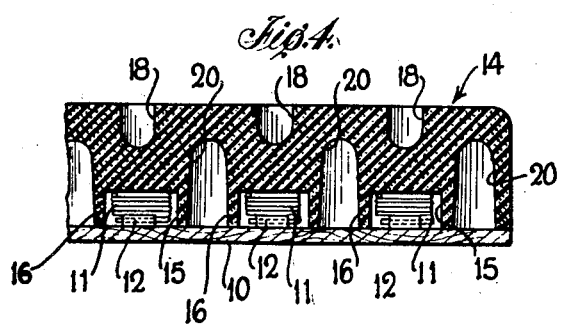
INVENTOR
HYLAND C. FLINT
BY Ely & Frye
ATTORNEYS Patented July 4, 1950

2,514,214

UNITED STATES PATENT OFFICE 2,514,214

CUSHIONING STRUCTURE

Hyland C. Flint, Akron, Ohio, assignor to The Firestone Tire & Rubber Company, Akron, Ohio, a corporation of Ohio Application April 15, 1946, Serial No. 662,225

3 Claims. (Cl. 155—179)

This invention relates to cushioning structures, and more especially, it relates to the cushions of seats, such as are employed in passenger automobiles, buses and railway and trolley coaches. However, its utility is not limited to the situations mentioned, and the principles of the invention advantageously may be employed in the construction of mattresses and similar appliances.

The chief objects of the invention are to provide an improved cushioning structure comprising two different kinds of resilient supporting or cushioning elements; to provide a combination of two different cushioning elements to effect efficient cushioning within a limited space, specifically, a space of limited height; to provide a cushion of the character mentioned wherein the volume of one of the cushioning elements is reduced and a saving in cost is achieved; to provide a cushioning structure of the character mentioned wherein the cushioning elements are so arranged as to achieve superior circulation of air, whereby heat in the structure is dissipated; and to provide a cushioning structure capable of many variations in its cushioning characteristics.

According to the invention, the foregoing and other objects are achieved by the novel combination of two inherently different types of resilient elements, which elements mutually cooperate to achieve the contemplated function of the cushioning structure of the invention in a superior manner. One of the resilient elements employed is composed of latex foam rubber. The other resilient element of the structure is a plurality of parallel, upwardly arched, transversely flat wire spring units, the same being a commercial product shown and described in the Kaden Patent No. 2,002,399, issued May 21, 1935.

Both of said elements require certain amounts of space for efficient operation and to provide maximum comfort to the user of the cushion. Moreover, both elements are inherently capable of considerable variation in resilience or yieldability during deformation or deflection, which results in compression of the rubber element and tension in the spring elements. The variability of the rubber structure arises from, (a) variation of density as the result of variations in the time consumed in whipping air bubbles into the rubber latex during processing thereof, prior to vulcanization, (b) variation in the height (thickness) of the rubber element, and (c) the number and size of cavities or recesses that are formed in the element. The variability of the spring unit arises from four causes, namely; (a) the gauge of the wire of which the unit is composed, (b) the height of the arc midway between the fixed ends of the unit, (c) the distance apart of said fixed ends, and (d) the radius of the turns in the sinuosities of the spring wire, or, differently stated, the number of sinuosities in the spring unit.

It is inherent in the foamed rubber unit that the greater the height of the unit the less density is required, with the result that there is less stability, and a tendency to roll, both of which features are undesirable in a cushion or mattress. Conversely, reduction in the height of the unit requires greater density of structure with resulting hardness and loss of shock and vibration absorbing ability.

Each wire spring unit derives its characteristic physical qualities from its method of fabrication. This transversely flat spring is composed of wire and formed into sinuosities or undulations, and is given a permanent arcuate set by being tempered while coiled in a relatively small arc or roll. In use it is spread open by force into a relatively large arc and its ends anchored a determinate distance apart where they act as pivots. The height of the arc midway between the pivots and the distance apart of the latter determines the resistance to deflection of the spring. Generally, two inches is considered the maximum height for the arc. It is usual in spring units of the character described that in practical use the vertical distance of travel of the middle of the arc is greater than the height of the arc above the chord that subtends the arc. In other words, an arc having a height of two inches might require a travel distance of from 3 to 4 inches if spring units alone, unassisted by other elements, are employed to support the weight imposed upon the cushion or mattress. Thus spring units of this type are not entirely satisfactory for use as the sole resilient elements in cushions of relatively low height, since such springs require too great a distance of travel if they are to provide the desirable soft effect required.

As previously explained, the foam rubber cushion also is inefficient in a low cushion. However, by combining the two different elements in a novel manner, it is possible to produce an efficient cushion of low height due to the increased number of variables involved.

The invention is more particularly described hereinafter, by way of example, having reference to the accompanying drawing of which:

Fig. 1 is a fragmentary plan view of a cushioning structure embodying the invention, a part thereof being broken away and in section to reveal underlying structure;

Fig. 2 is a section on line 2—2 of Fig. 1;
Fig. 3 is a section on line 3—3 of Fig. 1; and
Fig. 4 is a section on line 4—4 of Fig. 1.

Referring to the drawing, there is shown a cushioning structure that advantageously may be employed in the seats of motor vehicles, railway and trolley coaches, and other environments where personal comfort while sitting is desired. It is also within the purview of the invetnion to employ the principles thereof in mattresses and the like to assure comfort while reclining.

As shown in the drawing, the cushioning structure comprises a rigid base member 10 of oblong shape having rounded corners. Said base member conveniently may be made of wood because of its light weight and low cost. Mounted upon the base 10 is a plurality of wire spring units 11—11 of the Kaden type aforementioned, each of which units is secured to the said base by hinge clips 12, 12 in which the terminal portions of the unit are pivotally received. The hinge clips 12 are mounted adjacent two opposite margins of the base 10, and the spring units span the base in parallelism, in laterally spaced relation to each other. As is clearly shown in Fig. 2, the springs 11 are upwardly arched in operative position, the greatest height of the arch being midway between the hinge clips 12. Each spring is transversely flat, and is composed of a succession of sinuosities or undulations, as previously explained.

Superposed upon the base member 10 and spring elements 11 is a body of resilient material, specifically, vulcanized latex foam rubber, which body is designated as a whole by the numeral 14. Said body is molded to the general shape of the cushion, and is formed on its under side with a plurality of arcuate transverse recesses 15, 15 in which the respective spring units 11 are received. The concavity of each recess 15 is complemental to the convexity of the spring unit 11 received therein so that the bottom face of the recess rests flush upon the top of the spring. In width, each recess may be slightly wider than the spring therein to enable relative movement between the spring and lateral faces of the recess upon deflection of both, as weight is imposed upon the cushion structure. The material between the several recesses 15 constitutes ribs or piers 16 that bear upon the base member 10 and supplement the springs 11 in supporting a superposed weight. The body structure 14 also bears upon the base member 10 at the marginal region of the four sides thereof. As previously stated, the body structure 14 is molded to the general shape of a cushion, which, as best shown in Figs. 2 and 3, is higher at the front (left) side thereof than it is at the rear (right), with the result that the top of the structure slopes downwardly toward the rear. Also the front of the structure somewhat overhangs the base 10, as shown, with the result that the highest point of the spring units 11, which is midway between the ends thereof, will be located somewhat rearwardly of the transverse centerline of the cushion. The weight of a person seated on a cushion normally is centered slightly to the rear of the transverse centerline of the cushion, which, in the present invention, is in the area where the arched spring units 11 attain their greatest elevation, and the thickness of the rubber structure overlying said spring units is at its minimum.

In order that the cushion shall have the same "feel" throughout the entire extent of the regions above the spring units 11, each of said regions is formed with a series of upwardly opening cavities or voids 18, 18 arranged in the central plane of the underlying recesses 15. Said cavities open onto the top face of the cushion, are of cylindrical shape and have rounded or hemispherical bottoms. The said bottoms are spaced from the respective recesses 15 approximately the same distance as the highest points of said recesses are spaced from the top face of the cushion in the sitting area of the cushion, where no recesses 18 are provided. As shown in the drawing, each recess 15 has six recesses 18 thereover, five of which recesses are at the front of the structure and are of diminishing depth rearwardly from the front margin thereof, there being but one recess 18 over each recess 15 at the rear of the structure. The recesses 18 will be covered over and obscured by upholstery material (not shown) in a finished seat.

In order that the cushion element 14 shall have uniform resilience or "feel" throughout its entire area, additional series of recesses or voids 20, 20 are formed therein, which recesses are substantially similar in shape to the recesses 18. The recesses 20 are downwardly opening, and are located along the front-to-rear centerlines of the respective ribs or piers 16, and in the lateral regions of the cushion outwardly of the outermost recesses 15. The upper extremities of the recesses 20 are spaced from the top of the cushion substantially the same distance as the thickness of the cushion structure over the spring units 11 at the highest elevation of the arc of the latter. Because of the downward slope of the top of the cushion from front to rear thereof, the height of the recesses 20 progressively diminishes from the front to rear of each series thereof.

In the operation of the supporting structure, the ribs 16 and spring units 11 mutually cooperate to support the weight of a person seated upon the structure. Upon compression resulting from a superposed load, the ribs 15 become more dense and ultimately reach a point where further compression is not possible. At this point, however, the arc of the spring units 11 is not completely flattened, and they are still out of contact with the base member 10, above the latter. An important function of the spring units 11 is to provide a feeling of life and resilience to the cushion regardless of the degree of compression to which it is subjected. In this respect the Kaden type springs employed are superior to conventional helical coiled springs since the latter become inefficient when compressed to half their normal length.

Since the cushion member 14 is the element of greatest cost in the structure, the use of spring units 11 of the type shown results in a substantial cost saving due to the substantial volume of the recesses 15, and for the same reason there also is a substantial reduction in weight. The cushioning structure is of lower height than similar structures heretofore provided; it provides maximum comfort to a person seated thereon; and achieves the other advantages set out in the foregoing statement of objects.

Modification may be resorted to without departing from the spirit of the invention, or the scope thereof as defined by the appended claims.

What is claimed is:

1. A cushioning structure of the character described comprising a flat base member, a cushion of porous molded resilient material upon said base member formed on its under side with a plurality of parallel upwardly arched recesses extending in fore-and-aft direction, said recesses being laterally spaced apart from each other, arcuate upwardly extending transversely flat spring units mounted on the base member and received in the respective cushion recesses so as yieldingly to resist deflection of the cushion, and a plurality of series of individual voids extending downwardly into the cushion from the top side thereof, each of said series of voids disposed in the central plane of an underlying recess at the front and rear of the cushion.

2. A combination as defined in claim 1 whereof the voids are of graduated depth, their bottoms being spaced from the arched recesses substantially the same distance as the thickness of the cushion material over the highest point of the recesses.

3. A combination as defined in claim 1 including a plurality of series of voids extending upwardly into the cushion material from the bottom side of the cushion, between and at each side of the spring-recesses therein.

HYLAND C. FLINT.

REFERENCES CITED

The following references are of record in the file of this patent:

UNITED STATES PATENTS

| Number | Name | Date |
|---|---|---|
| 2,002,399 | Kaden | May 21, 1935 |
| 2,025,712 | Bickett | Dec. 31, 1935 |
| 2,146,136 | Foote | Feb. 7, 1939 |
| 2,251,036 | Clark | July 29, 1941 |
| 2,290,729 | Blair et al. | July 21, 1942 |
| 2,314,608 | Cunningham et al. | Mar. 23, 1943 |
| 2,359,003 | Sawyer | Sept. 26, 1944 |

FOREIGN PATENTS

| Number | Country | Date |
|---|---|---|
| 497,730 | Great Britain | Mar. 20, 1937 |
| 853,727 | France | Mar. 27, 1940 |